United States Patent
Sasaki (10) Patent No.: US 11,138,761 B2
(45) Date of Patent: Oct. 5, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoshitaka Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 16/417,253

(22) Filed: May 20, 2019

(65) Prior Publication Data

US 2019/0378302 A1 Dec. 12, 2019

(30) Foreign Application Priority Data

Jun. 12, 2018 (JP) .............................. JP2018-112075
Mar. 29, 2019 (JP) .............................. JP2019-067479

(51) Int. Cl.
- G06T 7/90 (2017.01)
- G06T 5/20 (2006.01)
- G06T 5/00 (2006.01)

(52) U.S. Cl.
CPC ................ G06T 7/90 (2017.01); G06T 5/002 (2013.01); G06T 5/20 (2013.01)

(58) Field of Classification Search
CPC .............. G06T 7/90; G06T 5/20; G06T 5/002
USPC ....................................................... 382/162
See application file for complete search history.

(56) References Cited

U.S. PATENT DOCUMENTS

| | | | | |
|---|---|---|---|---|
| 2003/0076424 A1* | 4/2003 | Minakuti | ............... | H04N 9/735 348/223.1 |
| 2004/0252303 A1* | 12/2004 | Giorgianni | .............. | G01J 3/508 356/402 |
| 2007/0221826 A1* | 9/2007 | Bechtel | ................... | G02B 3/005 250/208.1 |
| 2009/0010494 A1* | 1/2009 | Bechtel | ................... | G01S 11/12 382/104 |
| 2012/0050074 A1* | 3/2012 | Bechtel | ................... | G06K 9/209 340/988 |
| 2013/0258368 A1* | 10/2013 | Shigemoto | ............... | H04N 1/60 358/1.9 |
| 2013/0258369 A1* | 10/2013 | Suzuki | ................. | G06K 15/027 358/1.9 |

(Continued)

FOREIGN PATENT DOCUMENTS

JP 2006303783 A 11/2006

*Primary Examiner* — Ali Bayat
(74) *Attorney, Agent, or Firm* — Canon U.S.A., Inc. I.P. Division (57) ABSTRACT

An image processing apparatus to measure a color of an object based on a measurement target image obtained by imaging the object includes an acquisition unit, a derivation unit, and a calculation unit. The acquisition unit acquires the measurement target image and a reference image different from the measurement target image. The derivation unit derives a reference color based on an imaging parameter used in imaging of the measurement target image, an imaging parameter used in imaging of the reference image, and a pixel value of at least one pixel in the reference image. The calculation unit calculates, with reference to the reference color, a color evaluation value of at least one pixel corresponding to the object in the measurement target image.

20 Claims, 9 Drawing Sheets

(56) References Cited

U.S. PATENT DOCUMENTS

2015/0211987 A1* 7/2015 Burg .................... A61B 5/1172
356/402
2016/0269597 A1* 9/2016 Kanatani .............. H04N 1/6027

* cited by examiner

IMAGE PROCESSING APPARATUS, IMAGE PROCESSING METHOD, AND STORAGE MEDIUM

BACKGROUND OF THE INVENTION

Field of the Invention

The present disclosure relates to image processing to measure a color of an object with use of a color image captured by an imaging apparatus.

Description of the Related Art

Measurement of an object has been widely performed by a digital imaging apparatus such as a digital still camera or a digital video camera. Examples of the measurement include colorimetry of a product. Japanese Patent Application Laid-Open No. 2006-303783 discusses a method in which an optional object including a white board is imaged in a frame-sequential manner to acquire color images of three primary colors, the color images of the object are standardized by RGB values corresponding to the white board, and an RGB image of the object is converted into an XYZ image based on the color images of the object standardized in such a manner and calculated conversion parameters.

To measure a color of the object, it is necessary to set a reference white color. Therefore, for example, an image is captured so as to include a white area such as a white board in a part of the object, and the reference white color is set based on pixel values of pixels in the white area. In a case where a color of the object is measured, for example, in a dark place at night with few light sources, however, it is difficult to specify an area corresponding to the reference white color because the image is wholly dark. As a result, the color of the object in the dark place cannot be appropriately measured.

SUMMARY OF THE INVENTION

The present disclosure is directed to an image processing technology to appropriately set a reference color even in a case where a color of an object is measured in a dark place.

According to an aspect of the present disclosure, an image processing apparatus to measure a color of an object based on a measurement target image obtained by imaging the object includes an acquisition unit configured to acquire the measurement target image and a reference image different from the measurement target image, a derivation unit configured to derive a reference color based on an imaging parameter used in imaging of the measurement target image, an imaging parameter used in imaging of the reference image, and a pixel value of at least one pixel in the reference image, and a calculation unit configured to calculate, with reference to the reference color, a color evaluation value of at least one pixel corresponding to the object in the measurement target image.

Further features of the present disclosure will become apparent from the following description of exemplary embodiments with reference to the attached drawings.

DESCRIPTION OF THE EMBODIMENTS

Some exemplary embodiments of the present disclosure will be described in detail below with reference to accompanying drawings. Configurations described in the following exemplary embodiments are merely examples, and the present disclosure is not necessarily limited to the illustrated configurations.

In a first exemplary embodiment, a method of measuring colors of tail lamps (rear lamps) of an automobile is described as an example. A four-wheeled automobile is commonly mounted with red lights at right and left two positions on a rear surface. The tail lamps of the automobile have a role to notify driving operation such as deceleration operation and stop operation of the own automobile to a following automobile. The automobile is certainly driven in a place with few light sources in the surroundings at night in some cases. Therefore, it is necessary for, or may be addressed by, the tail lamps of the automobile to evenly emit light even in an environment in which there is no light source besides the tail lamps at night. Accordingly, in the present exemplary embodiment, measurement of the tail lamps of the automobile in the daytime and at night is achieved. An image processing apparatus according to the present exemplary embodiment performs image processing to measure colors of the tail lamps mounted on the right and left on the rear surface of the automobile when viewed in the bright daytime and colors of the tail lamps when viewed at night with no light source besides the tail lamps in the surroundings, based on an image of the rear surface of the automobile. The image processing in a case where a measurement target object (automobile) is measured based on an image captured in the daytime and the image processing in a case where the measurement target object is measured based on an image captured at night are different from each other. Accordingly, in the present exemplary embodiment, the processing is performed by switching a daytime measurement mode in which the measurement target object is measured based on an image captured in the daytime and a night measurement mode in which the measurement target object is measured based on an image captured at night.

Figure 1:
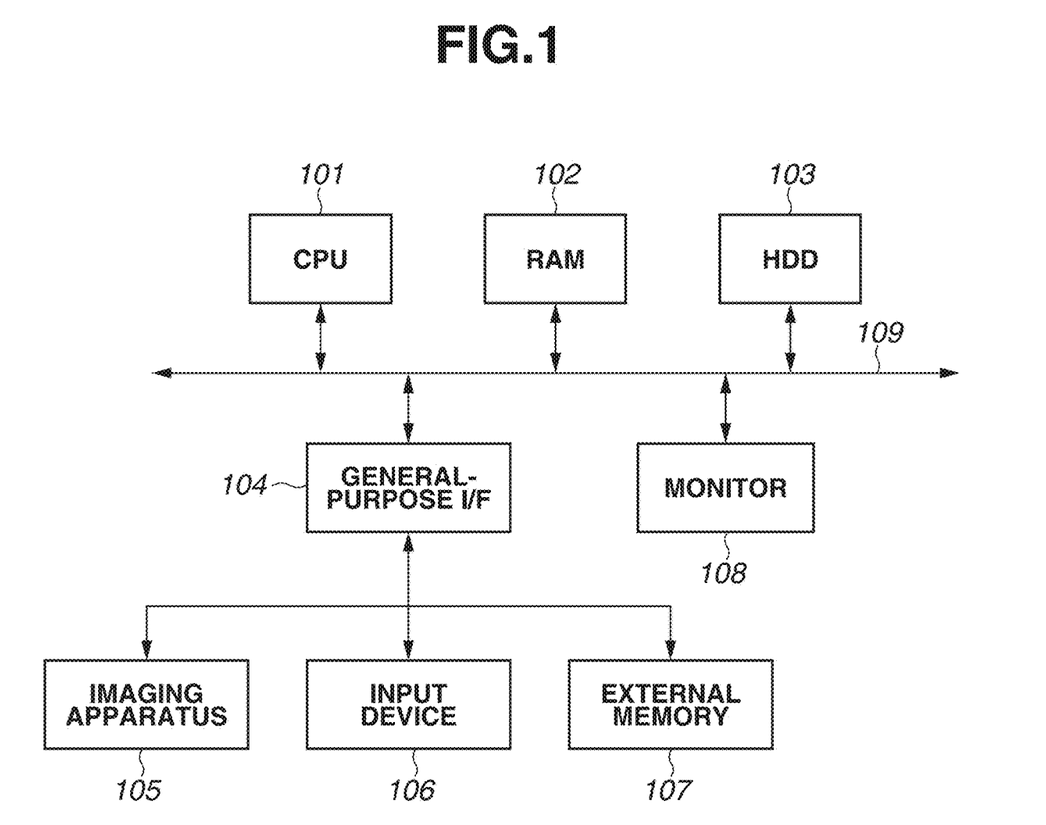
FIG. 1 is a block diagram illustrating a hardware configuration of an image processing apparatus.

FIG. 1 is a diagram illustrating a hardware configuration of the image processing apparatus according to the present exemplary embodiment. In FIG. 1, the image processing apparatus includes a central processing unit (CPU) 101, a random access memory (RAM) 102, a hard disk drive (HDD) 103, a general-purpose interface (I/F) 104, a monitor 108, and a main bus 109. The general-purpose I/F 104 connects an imaging apparatus 105 such as a camera, an input device 106 such as a mouse and a keyboard, and an external memory 107 such as a memory card, to the main bus 109.

In the following, the CPU 101 operates various kinds of software (computer programs) stored in the HDD 103 to achieve various kinds of processing. The CPU 101 first activates an image processing application stored in the HDD 103 and loads the image processing application to the RAM 102, and displays a user interface (UI) on the monitor 108. Subsequently, various kinds of data stored in the HDD 103 and the external memory 107, image data captured by the imaging apparatus 105, an instruction from the input device 106, etc. are transferred to the RAM 102. Further, various kinds of calculation are performed on the image data stored in the RAM 102 based on the processing of the image processing application, in response to an instruction from the CPU 101. A result of the calculation is displayed on the monitor 108, or stored in the HDD 103 and the external memory 107.

Figure 2:
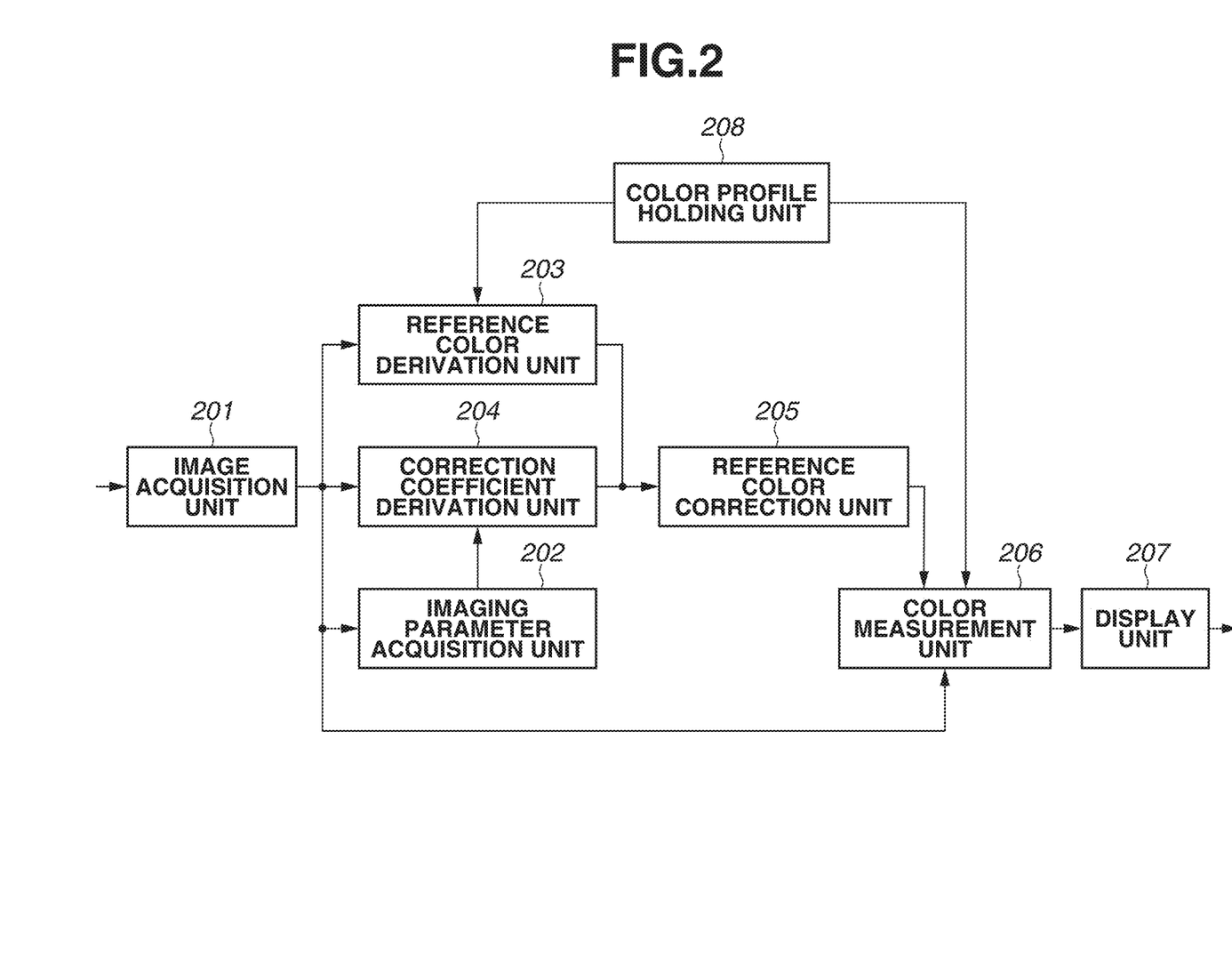
FIG. 2 is a block diagram illustrating a logical configuration of the image processing apparatus.

In the above-described configuration, the detail of the image processing achieved by the image processing application in response to the instruction from the CPU 101 is described. FIG. 2 is a block diagram illustrating a detailed logical configuration of the image processing apparatus according to the present exemplary embodiment. The image processing apparatus includes an image acquisition unit 201, an imaging parameter acquisition unit 202, a reference color derivation unit 203, a correction coefficient derivation unit 204, a reference color correction unit 205, a color measurement unit 206, a display unit 207, and a color profile holding unit 208.

The image acquisition unit 201 acquires an image to be measured, in response to an instruction from the CPU 101. In the daytime measurement mode, the image acquisition unit 201 acquires one captured measurement target image including the measurement target object and a while board for setting of a reference color. In contrast, in the night measurement mode, the image acquisition unit 201 acquires an image obtained by imaging the measurement target object at night as the measurement target image, and acquires an image obtained by imaging the white board in the daytime as a reference image. In the present exemplary embodiment, the measurement target image and the reference image are captured in the same environment except for the image capturing time. In the present exemplary embodiment, the image acquisition unit 201 acquires the image used as the measurement target image in the daytime measurement mode, also as the reference image in the night measurement mode. The reference image is acquired from the imaging apparatus 105, the HDD 103, or the external memory 107. The image obtained through imaging by the imaging apparatus 105 may be acquired after the image is once stored in a storage device such as the HDD 103. In addition, a plurality of acquired images is stored in the RAM 102 and the HDD 103.

The imaging parameter acquisition unit 202 acquires imaging parameters in imaging of the measurement target image and imaging parameters in imaging of the reference image, in response to an instruction from the CPU 101. At this time, a shutter speed, an aperture value, and a sensitivity in compliance with an international Organization for Standardization (ISO) are acquired as the imaging parameters. The imaging parameter acquisition unit 202 may acquire the imaging parameters in the imaging with reference to meta data attached to each image.

The reference color derivation unit 203 derives the reference color based on the image of the white board. The reference color derivation unit 203 derives the reference color from the measurement target image in the daytime measurement mode, and from the reference image different from the measurement target image in the night measurement mode. Data representing the derived reference color is stored in the RAM 102 and the HDD 103. The detail of the method of deriving the reference color will be described below.

The correction coefficient derivation unit 204 derives a correction coefficient to correct the reference color, based on the imaging parameters used in the imaging of the reference image and the imaging parameters used in the imaging of the measurement target image, in response to an instruction from the CPU 101. At this time, the correction coefficient is derived based on difference of exposure conditions and difference of the ISO sensitivity. The derived correction coefficient is stored in the RAM 102 and the HDD 103. The detail of the method of deriving the correction coefficient will be described below.

The reference color correction unit 205 corrects the reference color derived by the reference color derivation unit 203, with use of the correction coefficient derived by the correction coefficient derivation unit 204, thereby deriving a corrected reference color, in response to an instruction from the CPU 101. The derived corrected reference color is stored in the RAM 102 and the HDD 103. The detail of the method of deriving the corrected reference color will be described below.

The color measurement unit 206 measures a color of the measurement target image based on the corrected reference color derived by the reference color correction unit 205, in response to an instruction from the CPU 101. A result of the color measurement is stored in the RAM 102 and the HDD 103. The detail of the color measurement method will be described below.

The display unit 207 displays the result of the color measurement by the color measurement unit 206 on the monitor 108, in response to an instruction from the CPU 101. Color measurement data representing the derived color measurement result may be output to the external memory 107 connected to the general-purpose I/F 104, or may be output through connection of a printer, or the like.

Figure 3:
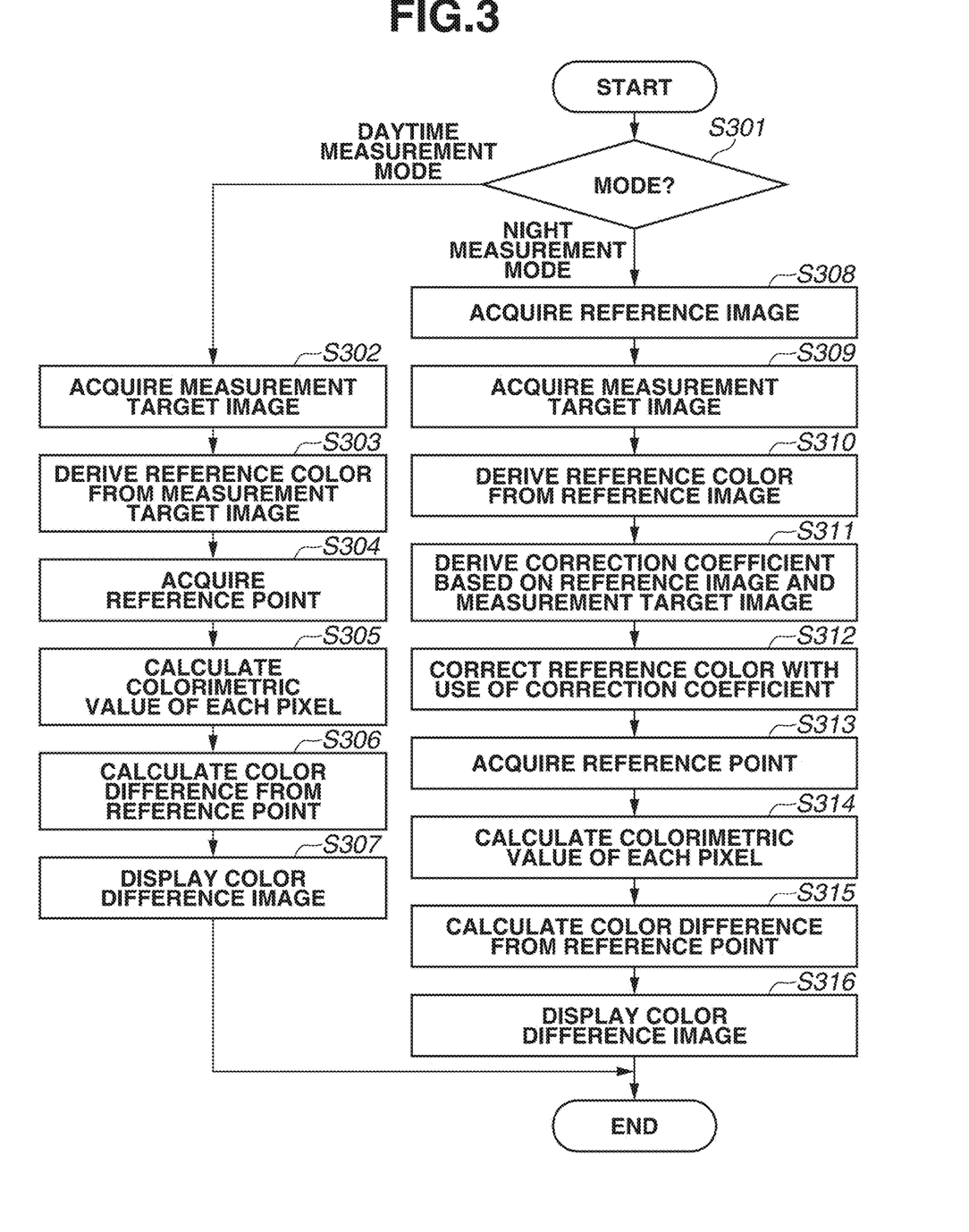
FIG. 3 is a flowchart illustrating flow of processing by the image processing apparatus.

In the following, the flow of the image processing in the logical configuration of the image processing apparatus described with reference to FIG. 2 is described in detail. FIG. 3 is a flowchart of the image processing according to the present exemplary embodiment. The CPU 101 reads out and executes a program achieving the flowchart illustrated in FIG. 3, thereby achieving the configurations (functions). In the following, each step is denoted by using "S".

First, in step S301, the image processing apparatus determines the color measurement mode. In a case where the mode is the daytime measurement mode to measure the appearance of the color of the object in the daytime (daytime measurement mode in step S301), the processing proceeds to step S302. In a case where the mode is the night measurement mode to measure the appearance of the color of the object at night (night measurement mode in step S301), the processing proceeds to step S308. The mode may be determined through input of an instruction by the user, or may be determined through analysis of the measurement target image.

Figure 4A:
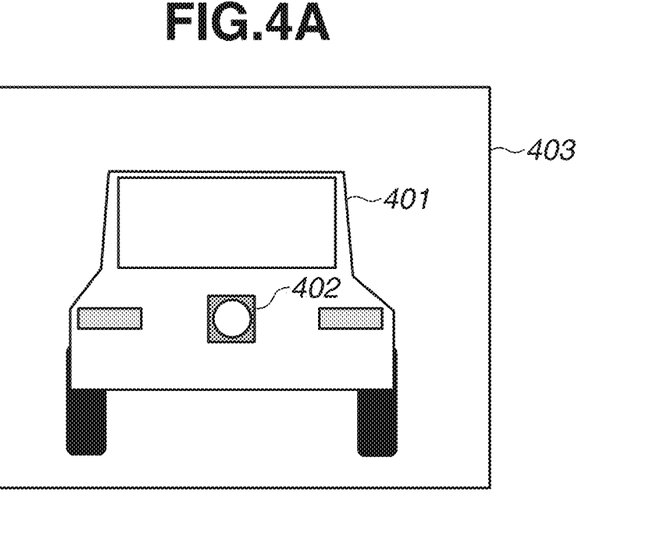
FIG. 4A is a diagram illustrating an example of a reference image.

The flow of the processing in the daytime measurement mode will be described below. In step S302, the image acquisition unit 201 acquires, as the measurement target image, an image that has been captured in the daytime so as to include the measurement target object. FIGS. 4A and 4B each illustrate an example of an image used in the color measurement. FIG. 4A illustrates an image 103 that has been captured outdoors in the daytime so as to include a measurement target object 401. The image 403 is acquired by imaging a stopped automobile to be measured with use of the imaging apparatus from a viewpoint for viewing tail lamps on the rear surface of the automobile. At this time, the tail lamps are turned on. Further, a white board 402 for setting of the reference color is also disposed so as to be included in the imaging range. In this example, the white board 402 is a plate member prepared separately from the automobile, and a color inside a circle of the white board 402 is white. The white board 402 is disposed by a non-illustrated supporting member so as to be orthogonal to an optical axis of the imaging apparatus. A size, a material, and a position of the white board are not limited to those in the example illustrated in FIG. 4A, for example, a white board of a member attached to the object 401 may be used. In the daytime measurement mode, the image captured such that luminance of the tail lamps emitting light with high luminance and luminance of an area of the white board that receives ambient light to develop a color both fall within a dynamic range is used. In other words, in the image 403, the luminance of the areas of the tail lamps emitting light with high luminance and the luminance of the area of the white board are both appropriately associated with output values without overexposure of the areas of the tail lamps and underexposure of the area of the white board. In step S303, the reference color derivation unit 203 derives the reference color from the measurement target image acquired in step S302.

Figure 5:
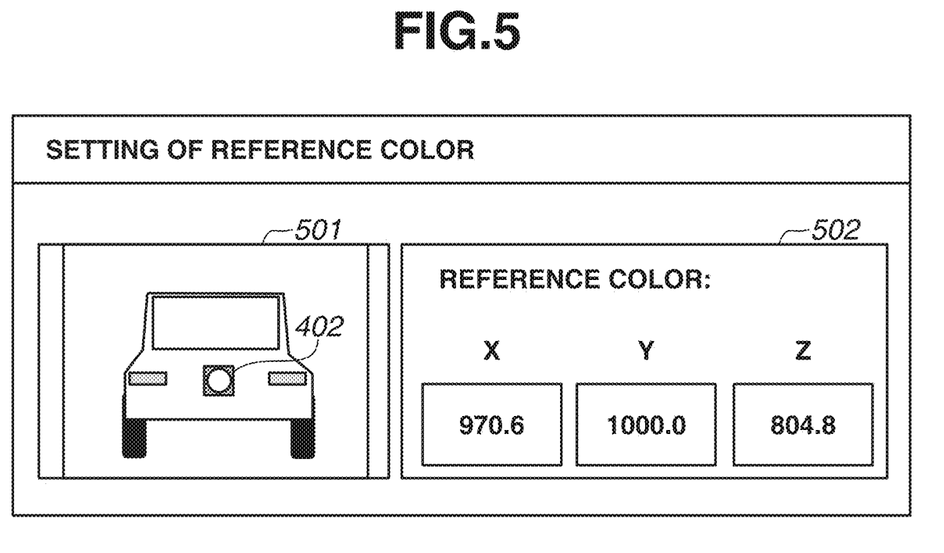
FIG. 5 is a diagram illustrating an example of a graphical user interface (GUI) for setting of a reference color.

FIG. 5 is a schematic diagram illustrating an example of a graphical user interface (GUI) for the user to give an instruction for the reference color. The measurement target image is displayed in an area 501. The user can give an instruction for the reference color by designating a desired or predetermined position in the measurement target image (in this example, a white point in the white board). The reference color derivation unit 203 acquires pixel values of a pixel at the position designated by the user. In this example, the measurement target image is a color image containing red (R), green (G), and blue (B). Therefore, the pixel values of the pixel at the position designated by the user are pixel values of respective colors RGB. The pixel values of the pixel designated as the reference color are denoted by Rw, Gw, and Bw. The reference color derivation unit 203 converts the pixel values (Rw, Gw, and Bw) of the pixel designated as the reference color, into colorimetric values (XYZ values) with reference to a predetermined color profile held by the color profile holding unit 208. For example, in a case where a 3×3 transformation matrix M is held as the color profile, the reference color derivation unit 203 drives colorimetric values of the reference color based on equations (1) and (2):

$$M = \begin{bmatrix} m_{00} & m_{01} & m_{02} \\ m_{10} & m_{11} & m_{12} \\ m_{20} & m_{21} & m_{22} \end{bmatrix}, \quad (1)$$

$$\begin{bmatrix} X_w \\ Y_w \\ Z_w \end{bmatrix} = M \begin{bmatrix} R_w \\ G_w \\ B_w \end{bmatrix}. \quad (2)$$

The colorimetric values Xw, Yw, and Zw represent colorimetric values of the reference color. The method of cal-culating the colorimetric values using the color profile is not limited to the method. For example, in a case where the measurement target image is an 8-bit RGB image, the pixel values of each pixel are limited to integer values from 0 to 255. Accordingly, the XYZ values may be previously calculated for all of combinations based on the equation (2), and pairs of corresponding RGB values and XYZ values may be stored in the profile as a look-up table (LUT). In a case of using the LUT, the reference color derivation unit 203 does not perform matrix calculation because the reference color derivation unit 203 can convert the RGB values into the XYZ values with reference to the LUT. The method of generating the LUT is not limited to the method, and any method is used as long as the LUT stores correspondence relationship between the RGB values and the XYZ values. For example, not the combinations of all colors but representative combinations may be only stored as the LUT, and the other colors may be derived from the representative combinations through interpolation.

In step S304, the color measurement unit 206 acquires a reference point in the measurement target image in order to output, as the color measurement result, a color difference image that represents the difference of colorimetric values between the pixel (reference point) as the reference in the measurement target image and each of pixels. In the present exemplary embodiment, the position of the reference point is designated by the user in the GUI illustrated in FIG. 5. Alternatively, the color measurement unit 206 may automatically set the reference point. For example, the color measurement unit 206 may detect the areas of the tail lamps, and may determine an optional position in the detected areas of the tail lamps as the reference point.

In step S305, the color measurement unit 206 converts the pixel values of each of the pixels in the measurement target image into colorimetric values with use of the equations (1) and (2), and further converts the colorimetric values into Lab values in color space compliant with Commission Internationale de l'Éclairage (CIE) LAB, the international authority on light, illumination, color, and color spaces located in Vienna, Austria and also known as International Commission on Illumination. In step S306, the color measurement unit 206 calculates the color difference between the Lab values of each of the pixels and the Lab values of the reference point with use of equations (3) to (7) and an expression (8) described below, thereby generating the color difference image.

In step S307, the display unit 207 displays the color difference image output from the color measurement unit 206. The above description corresponds to the processing in the daytime measurement mode. In the daytime measurement mode, the imaging parameter acquisition unit 202, the correction coefficient derivation unit 204, and the reference color correction unit 205 do not execute processing. Next, the processing in the night measurement mode is described.

In step S308, the image acquisition unit 201 acquires a reference image for setting of the reference color. As described above, the image 403 is acquired as the reference image. In step S309, the image acquisition unit 201 acquires an image obtained by imaging the object at night, as the measurement target image.

Figure 4B:
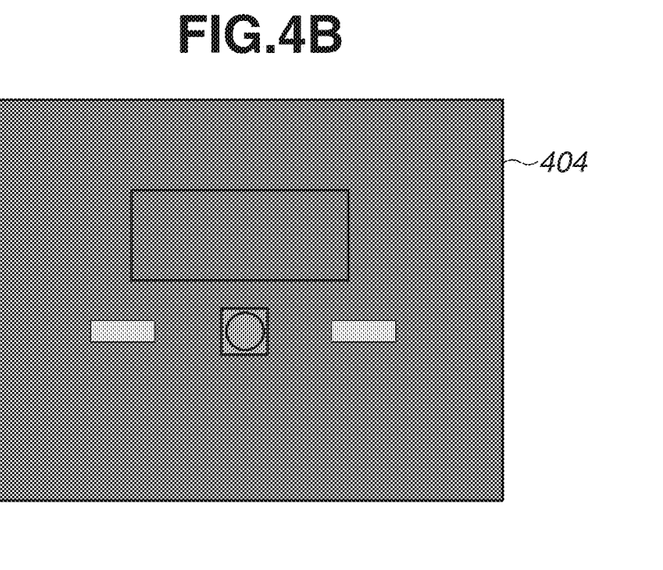
FIG. 4B is a diagram illustrating an example of a measurement target image.

The reference image and the measurement target image in the night measurement mode are described. FIG. 4B illustrates an image 404 that has been captured outdoors at night so as to include the measurement target object 401. The image 404 is acquired by imaging a stopped automobile to be measured with use of the imaging apparatus from a viewpoint for viewing the tail lamps on the rear surface of the automobile. As with the imaging of the reference image, the tail lamps of the automobile are turned on in the image 404. Further, the image 404 is acquired by performing imaging while the automobile and the imaging apparatus are located at the same positions as those in the imaging of the image 403. In other words, the distance and the positional relationship between the imaging apparatus and the automobile are substantially the same between the image 403 and the image 404. In the image 404, a white board is disposed at a position similar to the position of the white board in the image 403. The white board has an object color visible by reflecting light. Therefore, although the area of the white board is illustrated by a gray color in FIG. 4B, the white board actually develops substantially no color at dark night with few light sources around the white board. Accordingly, even when the imaging parameters are set corresponding to the white board in an environment without no light source around the white board, the area of the white board is subjected to underexposure in the captured image and is not recognizable. As a result, it is difficult for the user to give an instruction for the reference color to the measurement target image.

Therefore, in the present exemplary embodiment, the image 403 obtained by imaging the white board in the bright environment is acquired as the reference image for setting of the reference color, in addition to the measurement target image captured in the dark environment. The tail lamps to be measured in color have a light source color and are extremely bright even at night. Therefore, to image the object at night, it is necessary to perform imaging after adjustment of the imaging parameters in order to prevent the tail lamps from being overexposed, or the issue may be addressed by performing imaging after adjustment of the imaging parameters.

In step S310, the reference color derivation unit 203 derives the reference color from the reference image acquired in step S308. The processing in step S310 is similar to the processing in step S303. The reference image is displayed in the area 501 in the GUI illustrated in FIG. 5. The pixel values of the pixel at the position instructed by the user are converted into colorimetric values with use of the equations (1) and (2). In the case where the reference color of the image 403 has been already calculated in the daytime measurement mode, the reference color calculated in the daytime measurement mode may be held, and the colorimetric values Xw, Yw, and Zw may be used as the reference color also in the night measurement mode.

In step S311, the correction coefficient derivation unit 204 derives a correction coefficient to correct the reference color, based on the imaging parameters in the imaging of the reference image and the imaging parameters in the imaging of the measurement target image. More specifically, the correction coefficient derivation unit 204 first acquires, from the imaging parameter acquisition unit 202, a shutter speed (TV), an aperture value (AV), and a sensitivity (ISO) corresponding to the reference image, and a shutter speed (TV), an aperture value (AV), and a sensitivity (ISO) corresponding to the measurement target image. For example, a correction coefficient α corresponding to the shutter speed is calculated from an equation (3):

$$\alpha = TV_{prf}/TV_{img}, \quad (3)$$

where TVprf is the shutter speed for the reference image, and TVimg is the shutter speed for the measurement target image.

Likewise, a correction coefficient β corresponding to the aperture value and a correction coefficient γ corresponding to the ISO sensitivity are respectively calculated from equations (4) and (5):

$$\beta = (AV_{img}/AV_{prf})^2, \quad (4)$$

$$\gamma = ISO_{prf}/ISO_{img}. \quad (5)$$

The aperture value of the reference image is denoted by AVprf, and the ISO sensitivity of the reference image is denoted by ISOprf. The aperture value of the measurement target image is denoted by AVimg, and the ISO sensitivity of the measurement target image is denoted by ISOimg. In the present exemplary embodiment, the correction coefficient derivation unit 204 calculates a correction coefficient δ from an equation (6) based on the shutter speed (TV), the aperture value (AV), and the sensitivity (ISO):

$$\delta = \alpha \times \beta \times \gamma. \quad (6)$$

Description with specific numerical values will be given below. The image 404 is an image obtained by performing imaging such that the pixel values are not saturated in an area with high-luminance light source color (tail lamp). A short exposure time is set in the imaging in a dark environment such as night, as compared with a bright environment such as outdoor in the daytime. Accordingly, it is assumed that the shutter speed TVprf of the reference image is set to 1/50, the aperture value AVprf is set to F8, and the ISO sensitivity ISOprf is set to 200. In contrast, the shutter speed TVimg of the measurement target image is set to 1/200, the aperture value AVimg is set to F8, and the ISO sensitivity ISOimg is set to 200 as the imaging condition. In this case, the correction coefficient derived from the equations (3) to (6) is four.

In step S312, the reference color correction unit 205 corrects the reference color derived in step S310 with use of the correction coefficient δ. The reference color correction unit 205 corrects the reference color (Xw, Yw, Zw) with use of an equation (7):

$$\begin{bmatrix} X'_w \\ Y'_w \\ Z'_w \end{bmatrix} = \delta \begin{bmatrix} X_w \\ Y_w \\ Z_w \end{bmatrix}. \quad (7)$$

The reference color correction unit 205 outputs values (Xw', Yw', Zw') of corrected reference color as a reference color for calculation of the colorimetric values of each of the pixels in the measurement target image.

In step S313, the color measurement unit 206 acquires the reference point in the measurement target image in order to output, as a result of the color measurement, a color difference image that represents the difference of colorimetric values between the pixel (reference point) as the reference in the measurement target image and each of the pixels. The processing in step S313 is similar to the processing in step S304.

In step S314, the color measurement unit 206 converts the pixel values of each of the pixels in the measurement target image, into XYZ values with use of the equations (1) and (2). In step S315, the color measurement unit 206 calculates the color difference between a color of each of the pixels in the measurement target image and the color of the reference point. At this time, the color measurement unit 206 performs color evaluation based on the color difference in a uniform perception color space such as the CIELAB color space. At this time, the color measurement unit 206 calculates CIELAB values (hereinafter, referred to as Lab values) of each of the pixels in the measurement target image with use of expressions (8) to (11) and an equation (12):

$$XRate = (X/Xw')^{\frac{1}{3}}, \quad \text{when } X/Xw' > 0.00856$$
$$XRate = 7.787 \times (X/Xw') + 16.0/116.0, \quad \text{when } X/Xw' \le 0.00856 \quad (8)$$

$$YRate = (Y/Yw')^{\frac{1}{3}}, \quad \text{when } Y/Yw' > 0.00856$$
$$YRate = 7.787 \times (Y/Yw') + 16.0/116.0, \quad \text{when } Y/Yw' \le 0.00856 \quad (9)$$

$$ZRate = (Z/Zw')^{\frac{1}{3}}, \quad \text{when } Z/Zw' > 0.00856$$
$$ZRate = 7.787 \times (Z/Zw') + 16.0/116.0, \quad \text{when } Z/Zw' \le 0.00856 \quad (10)$$

$$L = 116.0 \times (Y/Yw')^{\frac{1}{3}} - 16.0, \quad \text{when } Y/Yw' > 0.00856$$
$$L = 903.29 \times (Y/Yw'), \quad \text{when } Y/Yw' \le 0.00856 \quad (11)$$

$$a = 500 \times (XRate - YRate)$$
$$b = 200 \times (YRate - ZRate) \quad (12)$$

where X, Y, Z are the colorimetric values of each of the pixels derived in step S314, and Xw', Yw', Zw' are the values of the corrected reference color.

Further, the color measurement unit 206 calculates the color difference with use of an equation (13):

$$\Delta E = \sqrt{(L_1-L_2)^2 + (a_1-a_2)^2 + (b_1-b_2)^2}. \quad (13)$$

where L1, a1, and b1 are the Lab values of the pixel corresponding to the reference point, and L2, a2, and b2 are Lab values of the pixel that is a target of the color difference calculation in the measurement target image.

The color measurement unit 206 outputs the color difference image including the color difference of each of the pixels.

Figure 6:
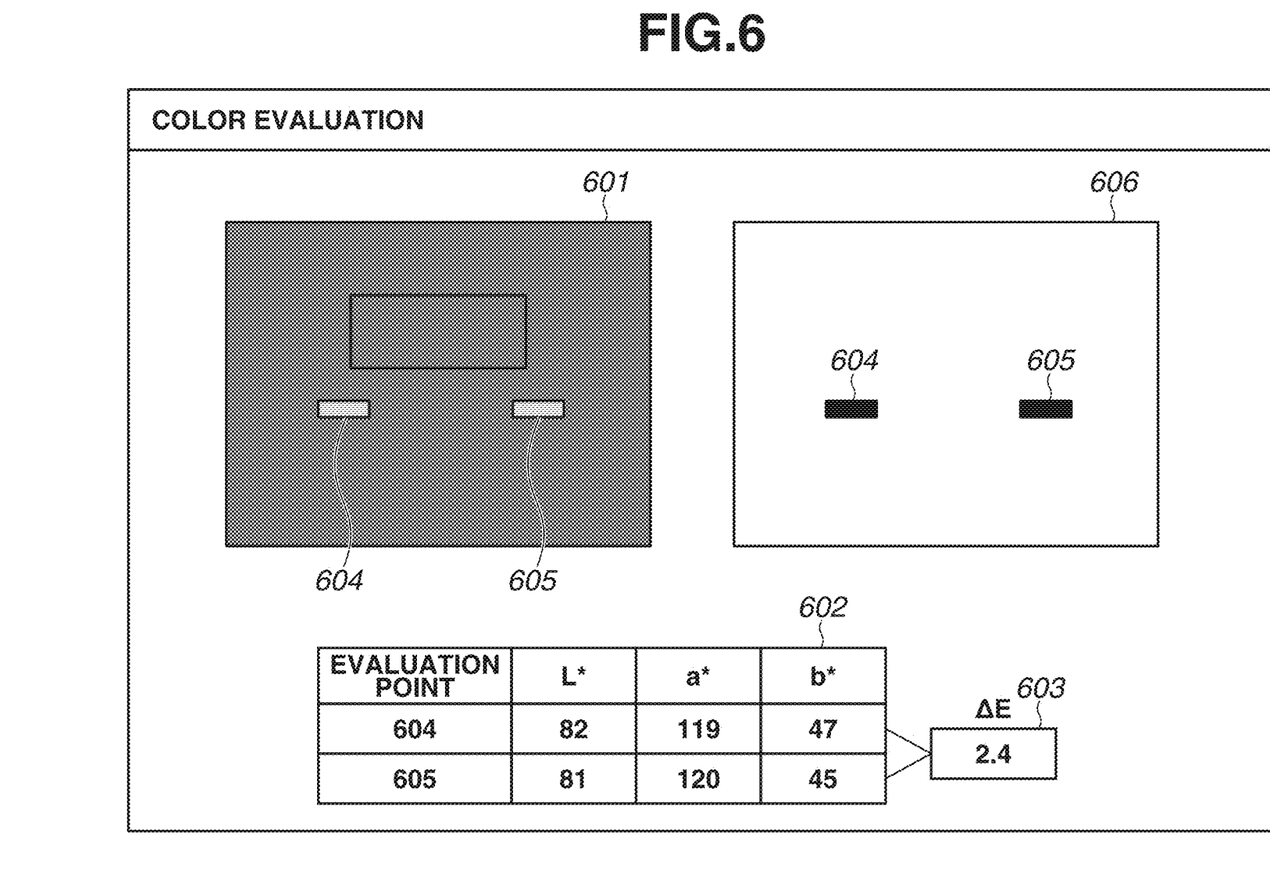
FIG. 6 is a diagram illustrating an example of a GUI for color measurement.

In step S316, the display unit 207 displays the color difference image output from the color measurement unit 206. FIG. 6 illustrates an example of a GUI to display the color difference image that is the result of the color evaluation. An area 601 is an area where the measurement target image is displayed. The display unit 207 first displays the color difference image in an area 606. In the color difference image, the pixel having a smaller color difference to the reference point is displayed darker, and the pixel having a larger color difference is displayed brighter. In this case, an example in which a pixel in an area 604 is regarded as a reference is illustrated. The color difference image is not limited thereto, and it is sufficient to perform display with a color that allows the user to easily distinguish the color difference. In addition, the user can select a point or an area to be evaluated, in the measurement target image 601. In this example, a point in the area 604 and a point in an area 605 on the two tail lamps in the measurement target image are designated. The Lab values at the designated points are displayed in a color value display area 602. Furthermore, the color difference between the selected two points is displayed in a color difference display area 603.

The image processing according to the present exemplary embodiment then ends. As described above, when the extremely bright areas of the tail lamps are prevented from being overexposed at dark night, the other area is substantially subjected to underexposure. To calculate the Lab values representing the color, a pixel in an area of a white object in an image obtained by imaging the white object is generally referred as the reference color. Accordingly, to set the reference color, the user designates the area corresponding to the white object to give an instruction for the reference color. The white object, however, does not develop a color because there is substantially no light from its surroundings. As a result, in the image obtained by imaging the rear surface of the automobile in the dark environment, the area other than the area of the red tail lamps is black as illustrated in FIG. 4B. In a case where the measurement target image is substantially subjected to underexposure except for a partial area, the user cannot know the position to be designated as the reference color. Accordingly, in the present exemplary embodiment, presenting, to the user, an image that has been obtained by imaging the same object and the white board in the bright environment and is different from the measurement target image allows the user to easily set the reference color by operation similar to the operation in the case where the user performs normal color measurement (in daytime measurement mode). In particular, in the present exemplary embodiment, an image obtained by imaging the automobile same as the measurement target image and the white board from a similar viewpoint at a similar viewing angle is displayed as the reference image on the GUI. This allows the user to intuitively operate the setting of the reference color for measurement of the measurement target image even in the image different from the measurement target image.

Further, as with the above-described night measurement mode, more appropriate color values can be calculated by using the corrected reference color. In the existing technology, a color space based on a white point (reference color) is defined in order to calculate the Lab values. The white board, however, does not develop a color in the imaging in the dark environment because the white board has an object color, and the reference color corresponding to the white point cannot be acquired accordingly. Therefore, in the present exemplary embodiment, the XYZ values of the object developing white color in the dark environment are estimated based on the pixel values of the white board imaged in the bright environment.

Figure 7:
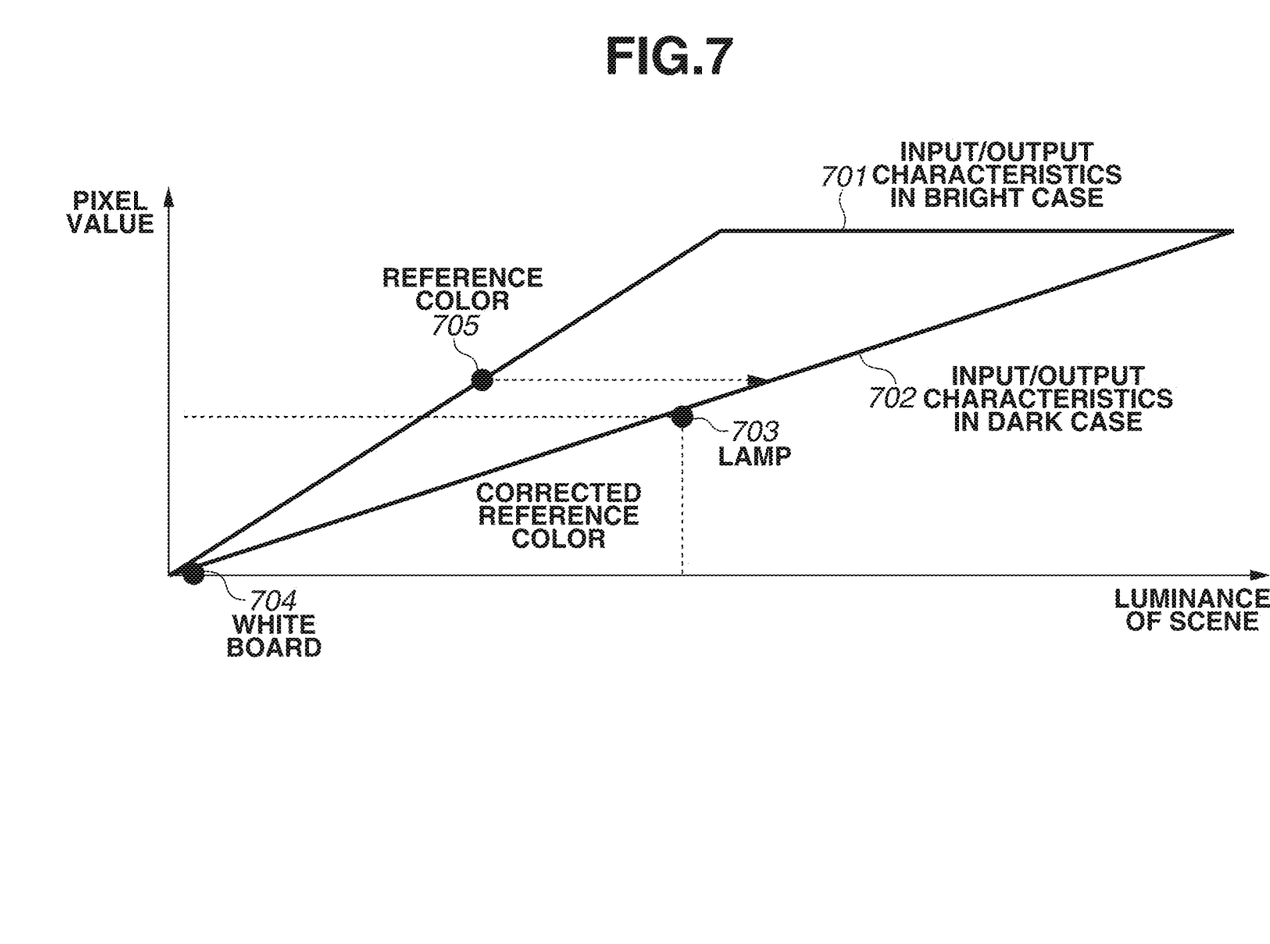
FIG. 7 is a diagram illustrating the reference color and a corrected reference color.

FIG. 7 is a diagram schematically illustrating input/output characteristics of the measurement target image and input/output characteristics of the reference image in the night measurement mode. The lateral axis indicates luminance of a scene, and the vertical axis indicates a pixel value. A line 701 represents the input/output characteristics of the reference image, i.e., the input/output characteristics of the image 403. In the reference image, luminance of the lamp and luminance of the white color as the reference color both linearly correspond to the pixel value. In contrast, a straight line 702 represents the input/output characteristics of the measurement target image. The imaging parameters of the measurement target image are set such that the area of the light source color (tail lamp 703) is not saturated. Accordingly, in the measurement target image, the luminance near the lamp luminance linearly corresponds to the pixel value. Luminance of a white board 704 is originally extremely low because the white board does not develop color, and the area of the white board is accordingly difficult to be recognized. Accordingly, a value in a case where the white board develops a white color in the dark environment is estimated as the corrected reference color by multiplying the values of a reference color 705 by the correction coefficient. The color values of each of the pixels in the dark environment are calculated with use of the corrected reference color, which makes it possible to calculate the color values with higher accuracy even in the dark environment.

Description with specific numerical values will be given below. When the values Xw, Yw, and Zw of the reference color derived in step S303 are 971, 1000, and 805, respectively, and the correction coefficient derived in step S304 is four, the values Xw', Yw', and Zw' of the corrected reference color become 3884, 4000.0, and 3220, respectively. In a case where the colorimetric values X, Y, and Z of a pixel of interest in the tail lamp area in the measurement target image are 4926, 2414, and 736, respectively, when the colorimetric values are converted into Lab values with use of an uncorrected reference color, the Lab values L, a, and b become 140, 188, and 74, respectively, and the lightness L exceeds 100. Since the lightness L is defined to a range from 0 to 100 in the CIELAB color space, the color difference cannot be measured in the CIELAB color space. In contrast, the Lab values L, a, and b that are converted from the colorimetric values of the pixel of interest with use of the corrected reference color obtained by correcting the reference color based on exposure time difference between the reference image and the measurement target image become 82, 119, and 47, respectively. This allows for measurement of the color difference.

As described above, according to the present exemplary embodiment, when the color measurement of the object imaged in the dark environment is performed, the color values of each of the pixels are calculated based on the reference color imaged in the bright environment. This makes it possible to calculate the color values even in the dark environment. Further, the user can set the reference color by simple operation even with respect to the measurement target image subjected to underexposure except for the light source color.

<Modifications>

In a case where the colorimetric values X, Y, and Z of the pixel of interest in the tail lamp area in the measurement target image are 9852, 4828, and 1472, respectively, the lightness is higher than the corrected reference color having the values Xw', Yw', and Zw' of 3884, 4000.0, and 3220, respectively. Therefore, the lightness L similarly exceeds 100. Accordingly, in a case where the values of the corrected reference color are smaller than the colorimetric values of the pixel of interest, a brighter reference color may be reselected from the reference image, or the corrected reference color may be further corrected.

Figure 8:
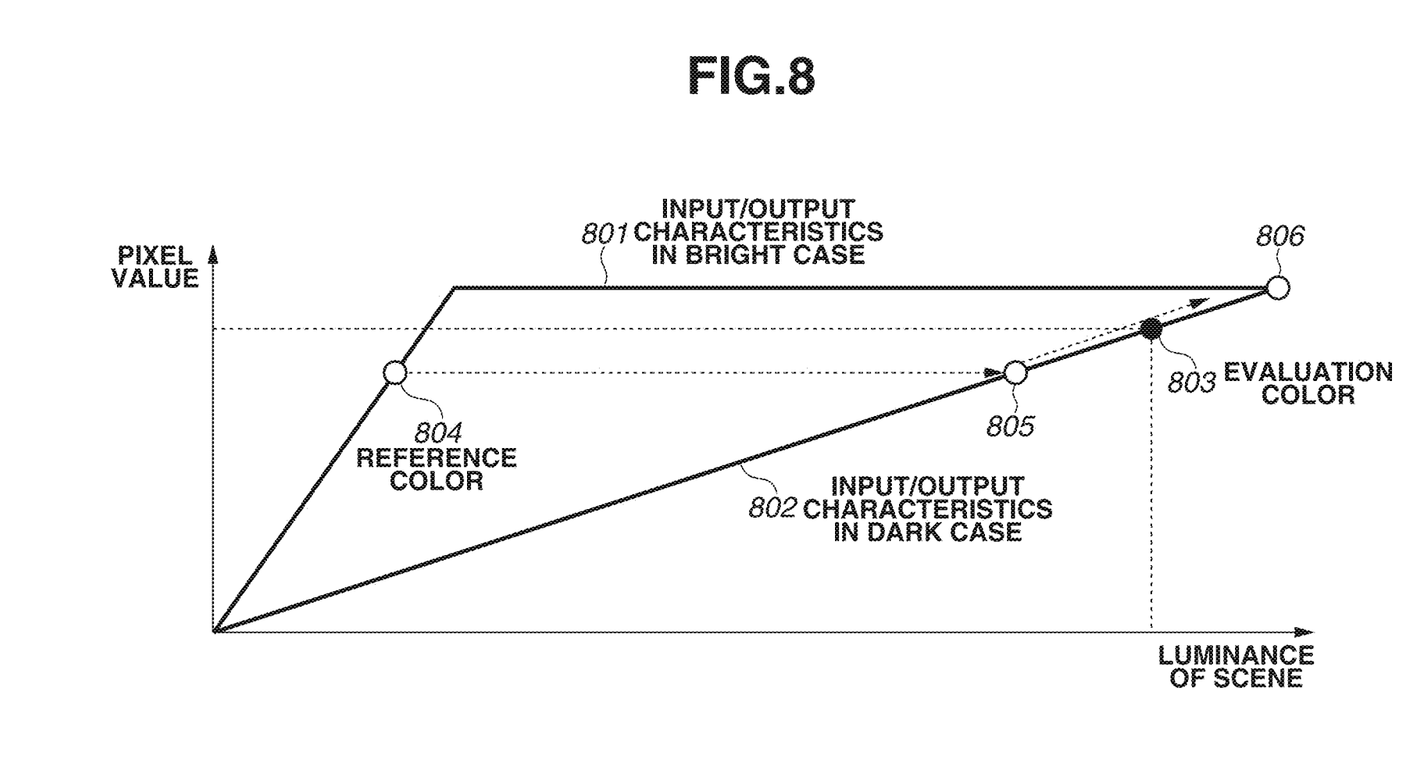
FIG. 8 is a diagram illustrating a modification of the reference color and the corrected reference color.

FIG. 8 is a schematic diagram illustrating an example in the case where the corrected reference color is further corrected. A line 801 represents input/output characteristics of the reference image. A straight line 802 represents input/output characteristics of the measurement target image. The imaging parameters of the measurement target image are set such that the area of the light source color (evaluation color 803) is not saturated. When a reference color 804 in the reference image is corrected based on exposure of the measurement target image, a color 805 is obtained. When the Lab values are calculated with reference to the color 805 in a case where the evaluation color 803 is brighter, the lightness L exceeds 100. Accordingly, the color 805 is corrected again such that a color brighter than the evaluation color, e.g., a color 806 becomes the corrected reference color. Differences from FIG. 3, in the case where the corrected reference color is further collected are described with reference to a flowchart of FIG. 9.

Figure 9:
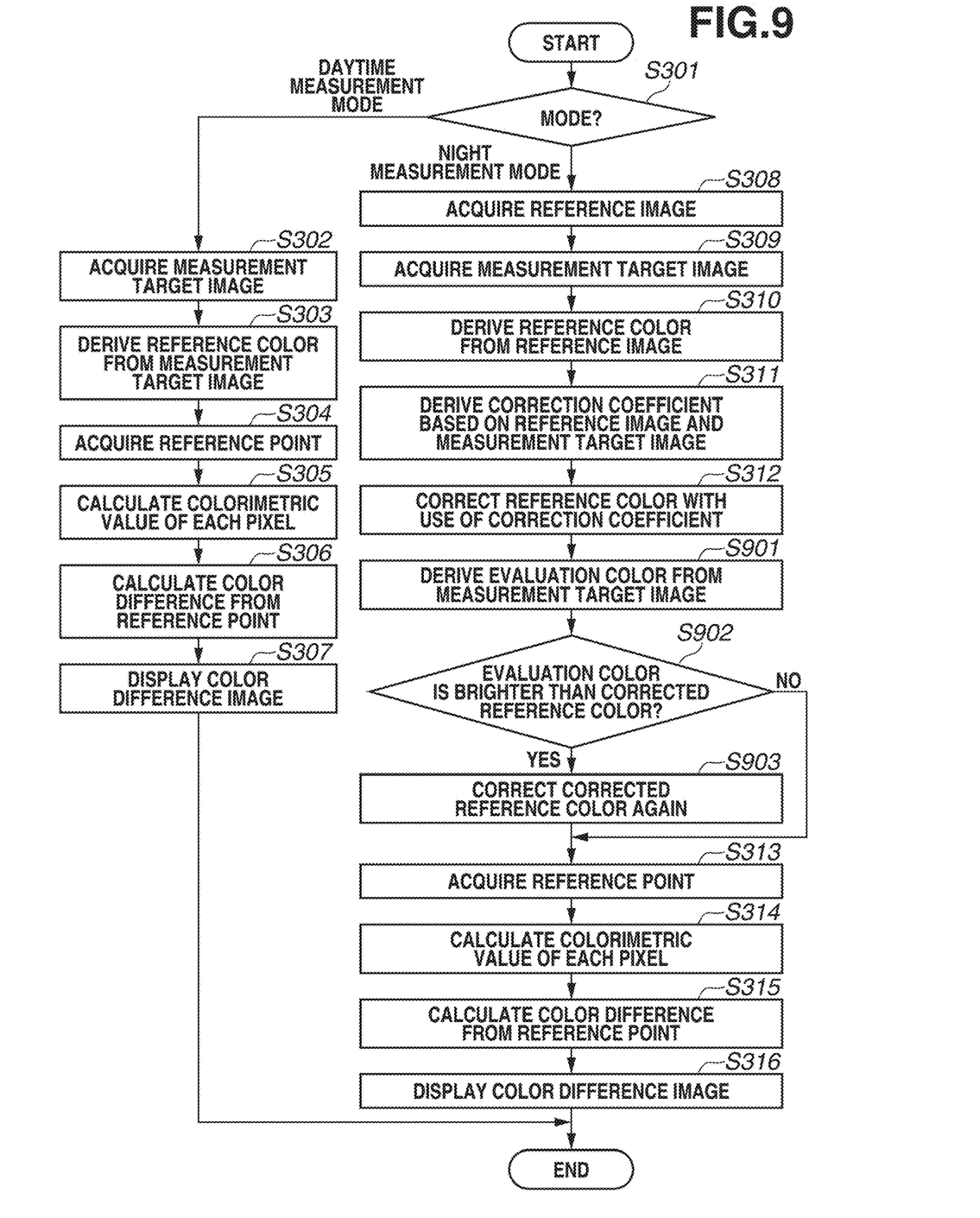
FIG. 9 is a flowchart illustrating flow of processing by the image processing apparatus in a modification.

In step S901, the evaluation color is acquired from the measurement target image. In step S902, the reference color correction unit 205 compares the evaluation color and the corrected reference color. In a case where the evaluation color is brighter than the reference color (YES in step S902), the processing proceeds to step S903. In a case where the evaluation color is darker than the reference color (NO in step S902), the processing proceeds to step S313. In step S903, the reference color correction unit 205 corrects the reference color again so as to be brighter than the evaluation color. The reference color may be corrected by a desired or predetermined gain correction method as long as the luminance Y of the reference color becomes higher than the luminance of the evaluation color. For example, when the correction coefficient is set to 5, the values Xw, Yw, and Zw of the reference color become 4855, 5000, and 4025, respectively, and the reference color is brighter than the evaluation color. Further, the desired or predetermined luminance of the reference color may be determined, and the correction may be performed based on the desired luminance. For example, in a case where the desired luminance Yw is 5500, the values Xw, Yw, and Zw of the reference color become 5341, 5500, and 4428, respectively.

In the present exemplary embodiment, the method of setting the white reference from the reference image has been described; however, the white reference may be set from the imaging condition. For example, the values Xw, Yw, and Zw of the reference color can be set to 6109, 6336, and 5227, respectively, from a ratio of XYZ (X:Y:Z=0.9642: 1:0.8249) at a color temperature of 5000K and appropriate luminance 6336 at an exposure value EV of 14.

In the above-described exemplary embodiment, the case where the daytime measurement mode and the night measurement mode are switched has been described. The image processing apparatus, however, may not switch the mode. For example, the image processing apparatus may receive the image 403 and the image 404 to generate both of a color difference image in the daytime and a color difference image at night, and display both color difference images. In this case, determination in step S301 may be eliminated. In this case, in the flowchart, the image processing apparatus performs processing in steps S302 to S307 on the image 403, and then performs steps S308 to S316 with use of the image 403 and the image 404.

Further, in the above-described exemplary embodiment, in the image obtained by imaging the tail lamps and the white board in the daytime, the luminance of the areas of the tail lamps and the luminance of the area of the white board are both within the dynamic range. Even in the daytime, however, the area of the white board may be underexposed when the imaging is performed based on the luminance of the areas of the tail lamps, whereas the areas of the tail lamps may be overexposed when the imaging is performed based on the luminance of the area of the white board. In this case, even in the daytime measurement mode, the measurement target image and the reference image are acquired. More specifically, an image captured with the imaging parameters set so as to prevent overexposure of the areas of the tail lamps is acquired as the measurement target image. In addition, an image captured with the imaging parameters set so as to prevent underexposure of the area of the white board is acquired as the reference image. At this time, the imaging parameters corresponding to the reference image and the imaging parameters corresponding to the measurement target image are also acquired.

The user is caused to designate the area of the white board in the reference image, and the pixel values Rw, Gw, and Bw of the pixel at the position designated by the user are acquired. The reference color is calculated from the pixel values in a manner similar to steps S303 and S310. The reference color is corrected based on the imaging parameters corresponding to the reference image and the imaging parameters corresponding to the measurement target image. For example, in a case where the reference color is corrected based on an exposure difference between the reference image and the measurement target image, the correction coefficient is calculated with use of the above-described equations (3) to (6), and the reference color is corrected with use of the equation (7) to determine the corrected reference color. The colorimetric values are calculated with use of the corrected reference color based on the expressions (8) to (11) and the equation (12). The subsequent processing is similar to the processing in steps S306 and S307. This makes it possible to appropriately generate the color difference image even when the tail lamps and the white board cannot be imaged within the dynamic range of the imaging apparatus even in the daytime.

In the daytime measurement mode as with the modification, the luminance of the lamps is higher than the luminance of the reference color designated by the user in some cases. In this case, the reference color may be corrected so as to become brighter than the lamps.

Further, in the above-described exemplary embodiment, the image 403 and the image 404 are captured in the same environment except for the capturing time; however, the images are not limited thereto. For example, an image acquired in a bright room and an image captured at dark night with few light sources besides the light sources mounted on the automobile may be used. Even in this case, the distance between the imaging apparatus and the automobile, and an attitude direction of the imaging apparatus to the automobile are desirably the same between the images.

The color measurement method is not limited thereto. For example, not the color difference but a lightness difference, a chromaticity difference, a color saturation difference, or a hue difference may be used, or another color difference such as $\Delta E94$ or $\Delta E00$ may be used. In addition, measurement may be performed in a color space such as CIELUV (CIE L*, u*, v* color space) or CIECAM of the International Commission on Illumination (CIE).

In the above-described exemplary embodiment, the reference color extracted from the reference image is corrected based on the differences of the shutter speeds, the aperture values, and the ISO sensitivities between the reference image and the measurement target image. For example, the correction coefficient δ may be derived based on one or two of the shutter speed, the aperture value, and the ISO sensitivity. Further, although the method of calculating the correction coefficient δ from the equation (6) has been described as an example, the correspondence relationship between the imaging parameters and the correction coefficient may be recorded as an LUT, and the correction coefficient derivation unit 204 may derive the correction coefficient with reference to the LUT. Furthermore, the example in which the reference color is acquired from the reference image and the reference color is corrected based on the exposure condition and the ISO sensitivity has been described in the present exemplary embodiment. Alternatively, a reference color in a specific exposure condition or a reference color for each ISO sensitivity may be designated by the XYZ values of a standard light source (D65), and the reference color may be corrected based on the exposure condition and the ISO sensitivity of the measurement target image.

In addition, in the above-described exemplary embodiment, the example in which the display unit 207 displays the user interface to display the color difference between the two tail lamps of the automobile has been described; however, the configuration is not limited thereto. For example, the color difference between two points in one tail lamp area may be evaluated, or two or more color differences of tail lamps and brake lamps may be compared at the same time. Further, since the Lab values can be calculated for each pixel in the above-described exemplary embodiment, color distribution may be displayed.

The present disclosure is achievable by supplying a program achieving one or more functions of the above-described exemplary embodiment to a system or an apparatus through a network or a storage medium, and causing one or more processors in a computer of the system or the apparatus to read out and execute the program. Moreover, the present disclosure is achievable by a circuit (e.g., application specific integrated circuit (ASIC))) achieving one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-112075, filed Jun. 12, 2018, and No. 2019-067479, filed Mar. 29, 2019, which are hereby incorporated by reference herein in their entirety.

What is claimed is:

1. An image processing apparatus to measure a color of an object based on a measurement target image obtained by imaging the object, the image processing apparatus comprising:

an acquisition unit configured to acquire the measurement target image and a reference image different from the measurement target image;

a derivation unit configured to derive a reference color for converting a pixel value of at least one pixel corresponding to the object in the measurement target image based on an imaging parameter used in imaging of the measurement target image, an imaging parameter used in imaging of the reference image, and a pixel value of at least one pixel in the reference image; and a calculation unit configured to calculate, based on the reference color, a color evaluation value of at least one pixel corresponding to the object in the measurement target image.

2. The image processing apparatus according to claim 1, wherein the derivation unit is configured to convert the pixel value of the at least one pixel in the reference image into a colorimetric value, and further configured to derive, as the reference color, a result obtained by correcting the colorimetric value based on the imaging parameter used in the imaging of the measurement target image and the imaging parameter used in the imaging of the reference image.

3. The image processing apparatus according to claim 2, wherein the derivation unit corrects the colorimetric value with use of a correction coefficient corresponding to a ratio of the imaging parameter used in the imaging of the measurement target image and the imaging parameter used in the imaging of the reference image.

4. The image processing apparatus according to claim 1,
wherein the reference image is an image obtained by imaging a white board for setting of the reference color, and
wherein, in a case where the image is obtained by imaging the white board, the derivation unit converts a pixel value of a pixel corresponding to the white board into a colorimetric value.

5. The image processing apparatus according to claim 1, wherein the measurement target image is an image obtained by imaging the object in an environment darker than an environment in which the reference image is captured.

6. The image processing apparatus according to claim 1, wherein the imaging parameter used in imaging of the measurement target image and the imaging parameter used in imaging of the reference image include at least one of the following: an exposure time, an aperture value, or a sensitivity in compliance with an international organization for standardization (ISO).

7. The image processing apparatus according to claim 1, wherein the calculation unit converts a pixel value of a pixel of interest in the measurement target image into an XYZ value, and calculates, as the color evaluation value and with use of the reference color and the XYZ value, a color of the pixel of interest in a color space compliant with Commission Internationale de l'Éclairage (CIE) LAB.

8. The image processing apparatus according to claim 1, wherein the calculation unit is configured to acquire a position of a reference point in the measurement target image, and is configured to calculate a difference of the color evaluation value between the reference point and each of pixels in the measurement target image.

9. The image processing apparatus according to claim 8, wherein the calculation unit is configured to calculate an evaluation value of any of the following: a color difference, a lightness difference, chromaticity difference, a color saturation difference, and a hue difference.

10. The image processing apparatus according to claim 8, wherein the calculation unit is configured to generate a color difference image that represents the difference of the color evaluation value between the reference point and each of the pixels in the measurement target image.

11. The image processing apparatus according to claim 8, further comprising an input unit configured to input an instruction from a user,
wherein, in response to the instruction from the user, the calculation unit acquires the position of the reference point.

12. The image processing apparatus according to claim 1, wherein the measurement target image is an image obtained by imaging an object having a light source color.

13. The image processing apparatus according to claim 1, further comprising a determination unit configured to determine a first mode or a second mode different from the first mode,
wherein, in the first mode, the acquisition unit acquires the measurement target image and the reference image, the derivation unit derives the reference color from the reference image, and the calculation unit performs measurement with use of the reference color, and
wherein, in the second mode, the acquisition unit acquires only the measurement target image, the derivation unit derives the reference color based on the measurement target image, and the calculation unit measures a color of an area corresponding to at least the object in the measurement target image with reference to the reference color.

14. The image processing apparatus according to claim 1,
wherein, in a case where the derivation unit derives the pixel value of the at least one pixel in the reference image, the derivation unit further converts the pixel value of the at least one pixel in the reference image into a colorimetric value, calculates a first corrected value by performing first correction processing on the colorimetric value, based on the imaging parameter used in the imaging of the measurement target image and the imaging parameter used in the imaging of the reference image, and calculates a second corrected value by performing second correction processing on the first corrected value, and
wherein the calculation unit refers to the second corrected value as the reference color.

15. The image processing apparatus according to claim 14, wherein the second correction processing is processing to correct luminance of the first corrected value to be higher than luminance corresponding to the object calculated by the calculation unit.

16. The image processing apparatus according to claim 14, wherein, to determine whether to perform the second correction processing, the derivation unit compares the first corrected value and at least one evaluation value calculated by the calculation unit.

17. The image processing apparatus according to claim 1, further comprising an input unit configured to input an instruction from a user,
wherein, in response to the instruction from the user, the derivation unit determines a pixel for calculation of the reference color in the reference image.

18. The image processing apparatus according to claim 1,
wherein the object to be measured is an automobile, and
wherein the calculation unit is configured to calculate a color evaluation value of a tail lamp of the automobile.

19. A method for an image processing apparatus to measure a color of an object based on a measurement target image obtained by imaging the object, the method comprising:
acquiring the measurement target image and a reference image different from the measurement target image;

deriving a reference color for converting a pixel value of at least one pixel corresponding to the object in the measurement target image based on an imaging parameter used in imaging of the measurement target image, an imaging parameter used in imaging of the reference image, and a pixel value of at least one pixel in the reference image; and calculating, based on the reference color, a color evaluation value of at least one pixel corresponding to the object in the measurement target image.

20. A non-transitory computer-readable storage medium to store instructions that, when executed by a computer, cause the computer to perform a method for an image processing apparatus to measure a color of an object based on a measurement target image obtained by imaging the object, the method comprising:

acquiring the measurement target image and a reference image different from the measurement target image;

deriving a reference color for converting a pixel value of at least one pixel corresponding to the object in the measurement target image based on an imaging parameter used in imaging of the measurement target image, an imaging parameter used in imaging of the reference image, and a pixel value of at least one pixel in the reference image; and calculating, based on the reference color, a color evaluation value of at least one pixel corresponding to the object in the measurement target image.

\* \* \* \* \*